United States Patent [19]

Okamatsu et al.

[11] 4,338,558

[45] Jul. 6, 1982

[54] INDUCTION MOTOR CONTROL SYSTEM AND METHOD

[75] Inventors: Shigetoshi Okamatsu; Takashi Tsuboi; Masahiko Ibamoto; Hiroshi Narita, all of Katsuta, Japan

[73] Assignee: Hitachi, Ltd., Tokyo, Japan

[21] Appl. No.: 199,977

[22] Filed: Oct. 23, 1980

[30] Foreign Application Priority Data

Oct. 24, 1979 [JP] Japan .................................. 54/136459

[51] Int. Cl.$^3$ ............................................. H02P 5/40
[52] U.S. Cl. ..................................... 318/802; 318/811
[58] Field of Search ................................ 318/798–803, 318/805, 807–812

[56] References Cited

U.S. PATENT DOCUMENTS

| | | | |
|---|---|---|---|
| 3,694,718 | 9/1972 | Graf et al. | 318/811 |
| 3,700,987 | 10/1972 | Deering | 318/811 |
| 3,731,169 | 5/1973 | Burgholte et al. | 318/801 |
| 3,967,173 | 6/1976 | Stich | 318/811 |

*Primary Examiner*—Gene Z. Rubinson
*Attorney, Agent, or Firm*—Craig and Antonelli

[57] ABSTRACT

A sine wave of a frequency to be generated in an inverter is compared with a triangular wave having a frequency N times (N: 15, 9, 3, 1) the frequency of the sine wave, so that a modulated pulse train is generated thereby to control the inverter. This inverter supplies power to an induction motor. With the increase in motor speed, N is reduced until it finally becomes 1. When the inverter transfers from an idle state to an active state, N is inhibited from becoming 1 but set to 3 even if the motor is running at high speed.

16 Claims, 8 Drawing Figures

INDUCTION MOTOR CONTROL SYSTEM AND METHOD

BACKGROUND OF THE INVENTION

1. Field of the Invention

The present invention relates to an improvement in a control system for the induction motor to which power is supplied through an inverter of pulse width modulation (PWM) type.

2. Description of the Prior Art

The use of a control system for the induction motor with a PWM inverter is spreading in the field of rail vehicles and the like.

A PWM inverter is one in which by changing the width of pulses periodically, the average value of an output voltage is produced as a sine waveform while being controlled by a modulated wave which varies the pulse widths, thereby producing a sine waveform output in accordance with the modulated wave. This inverter is provided with means for minimizing the high harmonics contained in the output voltage at the time of modulation.

In a modulator for producing such a pulse train, it is common practice to use a system for comparing a sine wave with a triangular wave. Specifically, a sine wave, and a triangular wave which is higher in frequency than the sine wave are applied to a comparator, from the output of which a modulated pulse train is produced. The average voltage of each pulse forms a sine wave of the same frequency as the applied sine waveform. If the inverter is driven by this modulated pulse train, the average value of the inverter output voltage takes the form of a sine wave voltage.

The output voltage of the inverter can be changed by changing the ratio of the peak values between the sine wave and the triangular wave applied to the comparator.

In this PWM inverter, with the increase in the frequency ratio N of the triangular wave to the sine wave used for modulation, the lower-order harmonics contained in the output voltage are reduced. In the case where an output of very low frequency is required for the speed control of an induction motor, therefore, the frequency ratio N is increased thereby to prevent any torque pulsation which otherwise might occur by the lower-order harmonics.

In the case of a large frequency ratio N, however, there is such a disadvantage that the continuously controllable range of the output voltage is narrowed. Specifically, when the pulse width is enlarged in order to increase the output voltage, the slit width corresponding to a period of time when a thyristor is turned off and then turned on again, is narrowed, and when it is narrowed to less than a predetermined width depending on the turn-off time of the thyristor, a commutation error occurs, thus making it impossible to increase the output voltage beyond a certain level. In order to avoid this disadvantage, it is desirable to switch the frequency of the triangular wave before the output voltage reaches the above-mentioned level. In the speed control of an induction motor with a PWM inverter, the output voltage is increased in proportion to the frequency and, however, within the range in which the output voltage is limited by the turn-off time of the thyristor, it is unnecessary to use a triangular wave of such a high frequency as at the time of starting from the viewpoint of torque pulsations since the frequency of the range is higher than that at the time of starting. Accordingly, if the frequency ratio N of the triangular wave to the sine wave is reduced, the slit width of the pulse train may be increased, thus making it possible to further increase the output voltage of the inverter.

In this connection, it is necessary to consider the case of N being 1, in which the induction motor is running at high speed. Under that condition, the triangular wave and the sine wave have the same frequency, and therefore no slit is included during the half cycle of the pulse train for controlling the inverter, so that the output voltage of the inverter becomes uncontrollable. Although this poses no problem in either cases where the induction motor is in a powering mode or in a regenerative mode. If the induction motor starts being powered or enters a regenerative mode while it is running by inertia at high speed, (in such a case where an electric rolling-stock is running by inertia at high speed), the maximum output voltage of the inverter is applied to the induction motor from the beginning.

Moreover, the induction motor has only a reactance of the windings before generation of an induced voltage, and therefore, if a maximum voltage is applied thereto while it is running by force of inertia, a surge current flows into the induction motor, thus often leading to a commutation failure of the inverter. That phenomenon has been confirmed and a commutation failure has been observed in the case of a test conducted by the inventors.

SUMMARY OF THE INVENTION

Accordingly, it is an object of the present invention to provide a control system for an induction motor in which the surge current is suppressed so that the inverter commutation failure is prevented when the induction motor supplied with power from a PWM inverter enters into either a powering or a regenerative mode from its high-speed running state by inertia.

According to the present invention, there is provided a control system for an induction motor, in which the frequency ratio N of a triangular wave to a sine wave is inhibited from becoming 1 at least during a predetermined length of time of transition from an idling state to a running state of the PWM inverter.

Specifically, in the case where the induction motor is running by force of inertia and no induced voltage is generated the PWM inverter is in an idling state. If the motor is running at high speed under that condition, only a pulse of the modulated wave is selected for each half cycle (N=1) for the reason mentioned above. If the inverter is started under that condition, the highest output voltage is produced so that the inverter becomes uncontrollable, with the result that a surge current flows in the motor. According to the present invention, the ratio N is inhibited from becoming 1 for a predetermined period of time after the starting of the inverter when it enters into a powering mode from an idling state thereof. Thus N takes the value of, say, 3, which makes possible the control of the output voltage of the inverter. As a result, the output voltage of the inverter may be suppressed by the function of a current control system or other control system, thereby to prevent a surge current of the motor and a commutation failure of the inverter. The above-mentioned predetermined period is a short length of time before a back electromotive force of the induction motor is produced and may be about 1 second. The prohibition time is of course released not by counting the time but by detecting directly or indirectly that the back electromotive force of the motor is produced. For instance, this prohibition is released by detecting a predetermined degree of modulation of a modulator circuit and a predetermined output voltage of the inverter.

DESCRIPTION OF THE PREFERRED EMBODIMENTS

Figure 1:
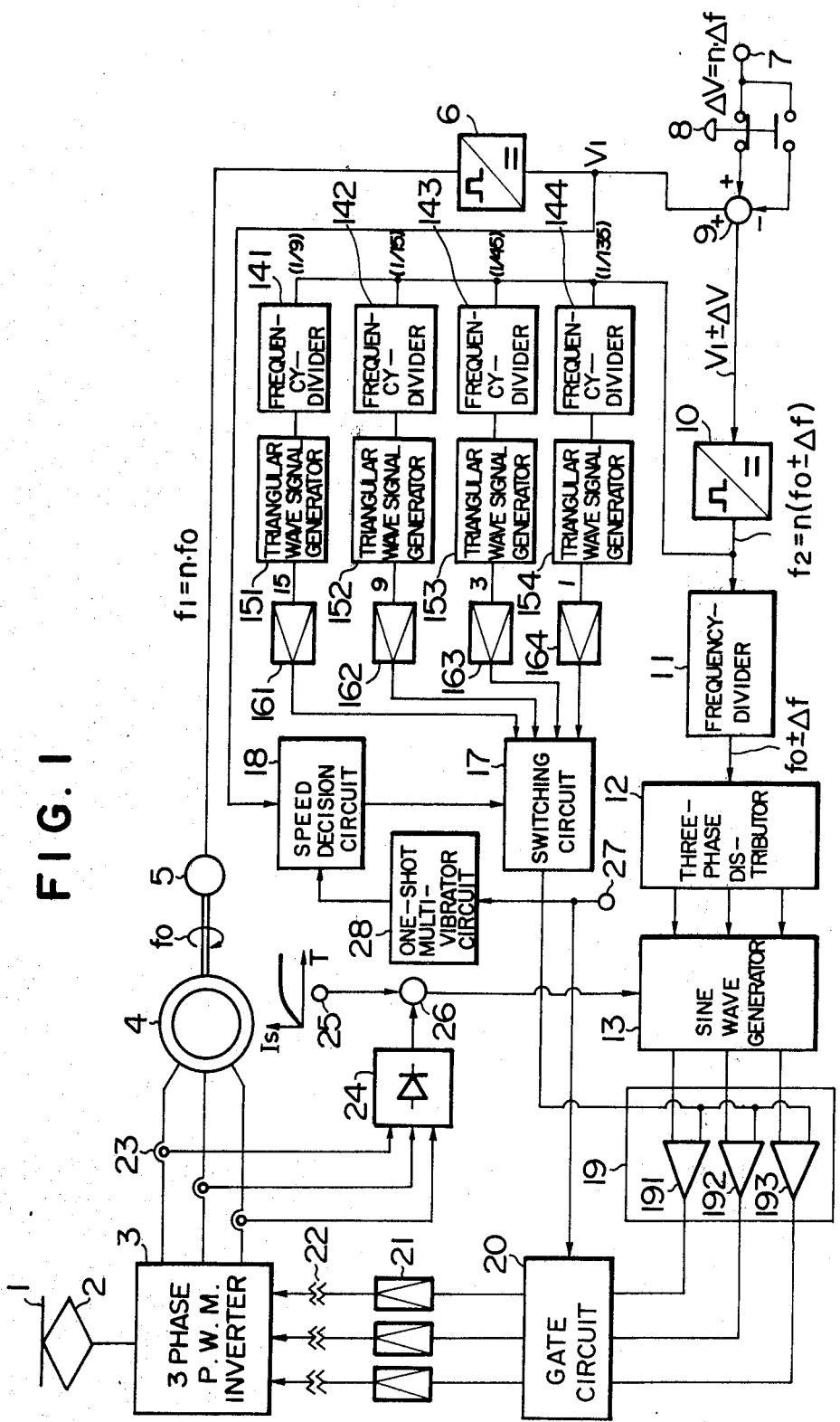
FIG. 1 is a block diagram showing a preferred embodiment of an induction motor control system according to the present invention.

A preferred embodiment of the present invention, which is applied to an induction motor making up a traction motor of an electric rolling-stock, is shown in FIG. 1.

An inverter 3 to which power is supplied from a DC stringing 1 through a pantograph 2 drives an induction motor 4 by an AC output which is variable in voltage and frequency. The gate of the inverter 3 is controlled by the above-mentioned PWM system.

The frequency $f_1$ (n times the rotational frequency $f_0$ of the induction motor 4, n being an integer) generated by a pulse generator 5 directly connected to the induction motor 4 is converted into an analog voltage $V_1$ by a frequency-analog converter 6.

The terminal 7 is supplied with a voltage $\Delta V$ ($\alpha n \cdot \Delta f$) equivalent to n times a selected slip frequency $\Delta f$. Numeral 8 denotes a powering/regenerative mode change-over switch, which is in the powering mode in FIG. 1. In the powering mode, an analog voltage $V_1$ proportional to the speed $f_0$ of the motor 4 and an analog voltage $\Delta V$ proportional to the selected slip frequency $\Delta f$ are added to or subtracted from each other by an adder-subtractor 9. In the regenerative mode, on the other hand, the voltage $\Delta V$ proportional to the slip frequency is subtracted from the voltage $V_1$ proportional to the motor speed. This voltage $V_1 \pm \Delta V$ is applied to a voltage-frequency converter 10, so that the converter 10 oscillates at the frequency $f_2$. This operation is expressed as $$f_2 = f_1 + n \cdot \Delta f = n(f_0 + \Delta f)$$

The rectangular wave output of the converter 10 is frequency-divided to 1/n by a frequency divider 11 and converted into three-phase signals 120° out of phase from one another by a three-phase distributor 12. Thus, a three-phase sine wave is generated through a sine wave generator 13. The rectangular wave output of the converter 10 is supplied to the frequency divider 11 on the one hand and to four frequency-dividers 141, 142, 143 and 144 on the other hand. In this way, the output of the converter 10 is frequency divided into, say, 1/9, 1/15, 1/45 and 1/135 respectively by the respective frequency dividers, the outputs of which are applied to corresponding triangular wave signal generators 151, 152, 153 and 154 respectively. As a result, the triangular wave signal generators 151, 152, 153 and 154 generate triangular wave signals of $f_2/9$, $f_2/15$, $f_2/45$ and $f_2/135$ respectively in frequency. Now, assume that n is 135. The output frequencies of the triangular wave signal generators 151 to 154 are 15, 9 and 3 times and once the output sine wave of the sine wave generator 13 as shown in the drawing, correspondingly and respectively. These triangular waves are applied to a switching circuit 17 through amplifiers 161, 162, 163 and 164, respectively.

A specific circuit configuration of each block will be described below. The frequency-voltage converter 6 and the voltage-frequency converter 10 may be comprised of an IC available on the market. The frequency dividers 11 and 141 to 144 are easily obtained from a well-known counter. A ring counter may be used as the three-phase distributor 12. The sine wave generator 13 and the triangular wave generators 151 to 154 may comprise a well-known PLL (pulse lock loop) circuit for producing sine wave and triangular wave signals.

Figure 3A:
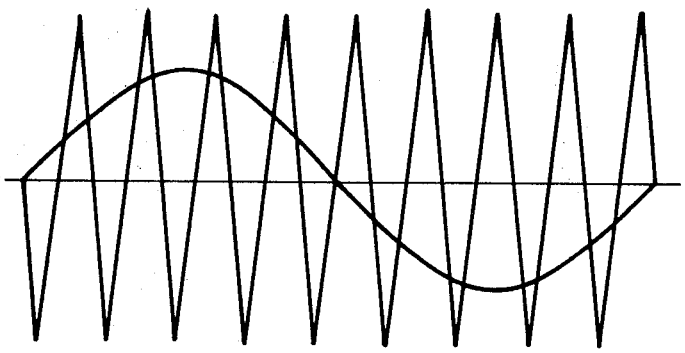
FIGS. 3A to 3E show voltage waveforms for explaining the operation of a PWM inverter.
Figure 3B:
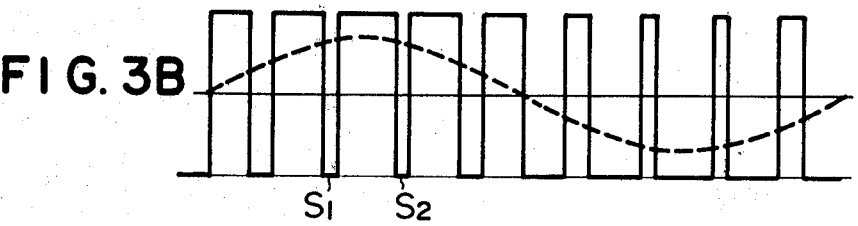

The switching circuit 17 applies one of the four triangular wave signals to a modulator circuit 19 in response to the output of a speed decision circuit 18. The modulator circuit 19 includes three operational amplifiers 191 to 193 schematically shown for comparing a sine wave voltage of each of the three phases with a selected triangular wave voltage, thus producing a pulse train modulated for each phase. This operation will be explained with reference to FIGS. 3A to 3E. The triangular wave shown in FIG. 3A has a frequency nine times that of the sine wave. In other words, the sine wave voltage and the triangular wave voltage (one phase) represent the case in which the output of the amplifier 162 is selected by the switching circuit 17. If the operational amplifiers 191 to 193 produce a positive saturation output when the sine wave voltage is higher than the triangular wave voltage, a pulse train as shown in FIG. 3B is obtained. When the inverter is controlled by this pulse train, the average output voltage thereof takes the form of a sine wave of the same frequency as that of the sine wave produced from the sine wave generator 13 as shown by dashed line.

The output voltage of this inverter is capable of being changed by changing the ratio of peak value between the sine wave and the triangular wave applied to the modulator circuit 19. If the peak value of the sine wave is increased, for instance, the slots $S_1$ and $S_2$ are narrowed, thereby increasing the output voltage of the inverter.

In this way, the voltage and frequency applied to the induction motor 4 are increased depending on the motor speed. As the frequency increases depending on the motor speed, the period of the output voltage of the inverter is shortened. Also, a high voltage is required, so that the width of the slots $S_1$ and $S_2$ is narrowed to such a degree until it reaches the limit due to the turn-off time of the thyristor in the inverter 3.

When the speed of the induction motor 4 reaches a predetermined value, the speed decision circuit 18 detects the predetermined value and the frequency of the triangular wave is switched over to a frequency three times that of the sine wave by the switching circuit 17.

Figure 3C:
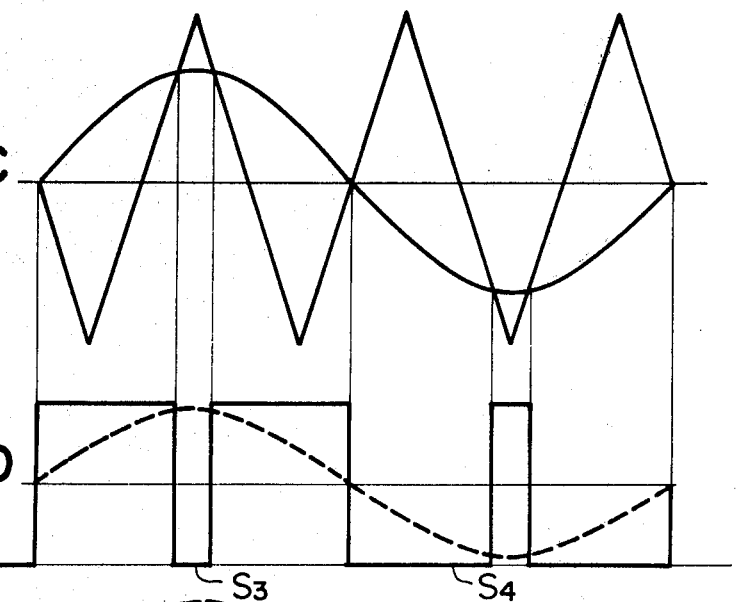
Figure 3D:
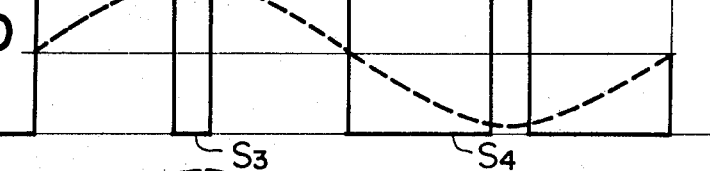

The modulation in this operation is shown in FIGS. 3C and 3D. As seen from these drawings, a higher inverter voltage is produced in spite of wider slots $S_3$ and $S_4$.

With a further increase in the speed of the induction motor 4, the frequency of the triangular wave is switched over to the same frequency as that of the sine wave by the speed decision circuit 18 and the switching circuit 17. The modulated wave and the average output voltage of the inverter in this operation are shown in FIG. 3E.

The modulated wave thus obtained is applied via a gate circuit 20, an amplifier 21 and a pulse transformer 22 to each thyristor in the inverter 3.

The output voltage of the inverter, on the other hand, is controlled by a constant-current control system. Specifically, the current of the motor 4 is picked up by a current transformer 23 and rectified by a rectifier circuit 24. The terminal 25 is supplied with a preset current command Is, which is compared with the detected current value by a comparator 26, so that the peak value of the sine wave generated at the sine wave generator 13 is adjusted in accordance with the difference between the current command Is and the detected current value. If the peak value of the sine wave changes, the output voltage of the inverter 3 changes, and finally the current of the induction motor 4 follows the command value Is.

Figure 3E:
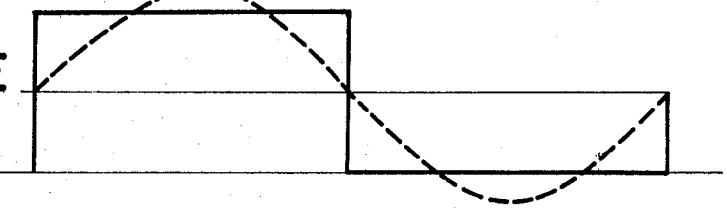

As seen from FIG. 3E, the output voltage of the inverter cannot be regulated in the case where the frequency ratio N of the triangular wave to the sine wave is 1. When the electric rolling-stock running at high speed by inertia enters either the powering mode or regenerative mode through the inverter 3, a high voltage is generated by the inverter 3 so that a surge current flows in the motor 4, thus causing a commutation failure of the inverter 3.

In order to avoid such a trouble, the present invention is so configured that when an inverter operation command is applied to the terminal 27, the gate circuit 20 is opened and a signal for prohibiting the switching to $N=1$ is applied to the speed decision circuit 18 through a one-shot multivibrator circuit 28.

Figure 2:
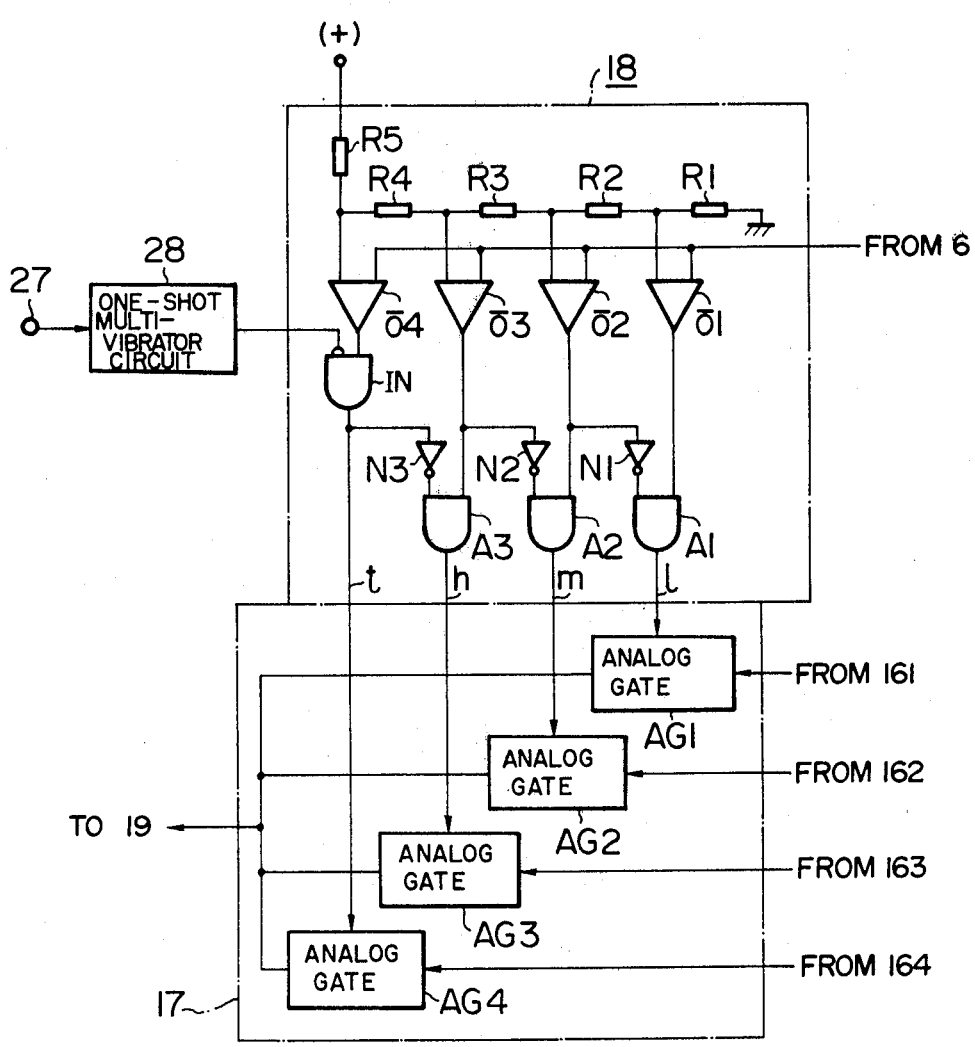
FIG. 2 is a circuit diagram of a specific example of a speed decision circuit and a switching circuit in FIG. 1.

A specific example of the switching circuit 17 and the speed decision circuit 18 is shown in FIG. 2. The speed decision circuit 18 includes resistors R1 to R5 for providing a speed reference voltage to the junction point of each resistor from the power supply (+). These reference voltages are compared with the voltage $V_1$ representing the speed of the electric rolling-stock at the operational amplifiers $\overline{O}1$ to $\overline{O}4$, and only when the electric rolling-stock speed voltage $V_1$ is higher than the reference voltage, an output is produced from the operational amplifiers. NOT circuits N1 to N3 and AND circuits A1 to A3 are for erasing the speed decision signal of lower order by the speed decision signal of upper order.

During normal operation of the electric rolling-stock, the terminal 27 is supplied with an inverter operation command and the output of the one-shot multi-vibrator circuit 28 has already disappeared, so that the inhibit circuit IN is ineffective. Thus, a low-speed signal l, a medium-speed signal m, a high-speed signal h or a highest-speed signal t is produced in accordance with the actual speed of the electric rolling-stock.

In the switching circuit 17, one of the analog gates AG1 to AG4 which is supplied with these speed decision signals opens thereby to pass one triangular wave to the modulator circuit 19.

Assume that the electric rolling-stock is running by inertia in the highest-speed range. The inverter 3 is not actuated and the induction motor 4 is running by inertia. In other words, neither the inverter operation command is applied to the terminal 27 nor the current command Is is applied to the terminal 25, so that the gate circuit 20 is closed and the inverter 3 is not actuated. In view of the fact that the highest speed is involved, however, the electric rolling-stock speed voltage $V_1$ is high and the speed decision circuit 18 produces the highest speed signal t. Thus a triangular wave of the same frequency as the sine wave is applied to the modulator circuit 19 through the analog gate AG4 in the switching circuit 17. As a result, the modulator circuit 19 is in stand-by state generating the modulated wave shown in FIG. 3E.

Assume that the operator applies an inverter operation signal to the terminal 27 in order to enter either a powering or a regenerative mode. The current command Is slowly rises with time T as shown in FIG. 1. The operation mentioned below is the same regardless of the position of the powering/negenerative mode change-over switch 8. In response to the inverter operation command, the one-shot multivibrator circuit 28 produces an output for a predetermined period of time. This output is applied to the inhibit terminal of the inhibit circuit IN in the speed decision circuit 18, so that the highest speed decision signal t is erased while preventing the erasure of the lower-order signal, namely, the high-speed decision signal h. Thus the analog gate AG4 of the switching circuit 17 closes and the gate AG3 opens, thus supplying the triangular wave of the frequency of 3 in N to the modulator circuit 19.

As a result, the modulator circuit 19 is switched over to the operating condition shown in FIGS. 3C and 3D. This modulated wave is applied through the open gate circuit 20 to the inverter 3 by the inverter operation command, so that the inverter 3 begins to operate in a mode in which the output thereof is controllable. As a result, the inverter 3 produces an AC voltage of a frequency obtained by the slip frequency $\Delta f$ being added to (at the time of powering) or subtracting from (at the time of regeneration) the frequency $f_0$ corresponding to the speed of the motor 4. Under that condition, the voltage is regulated by the above-mentioned voltage regulation system. Specifically, when the motor current is likely to exceed the command value Is, the output sine wave of the sine wave generator 13 is reduced thereby to reduce the output voltage of the inverter 3. The motor current follows the command value Is and thus is prevented from increasing. This also prevents a commutation failure of the inverter 3.

Figure 4:
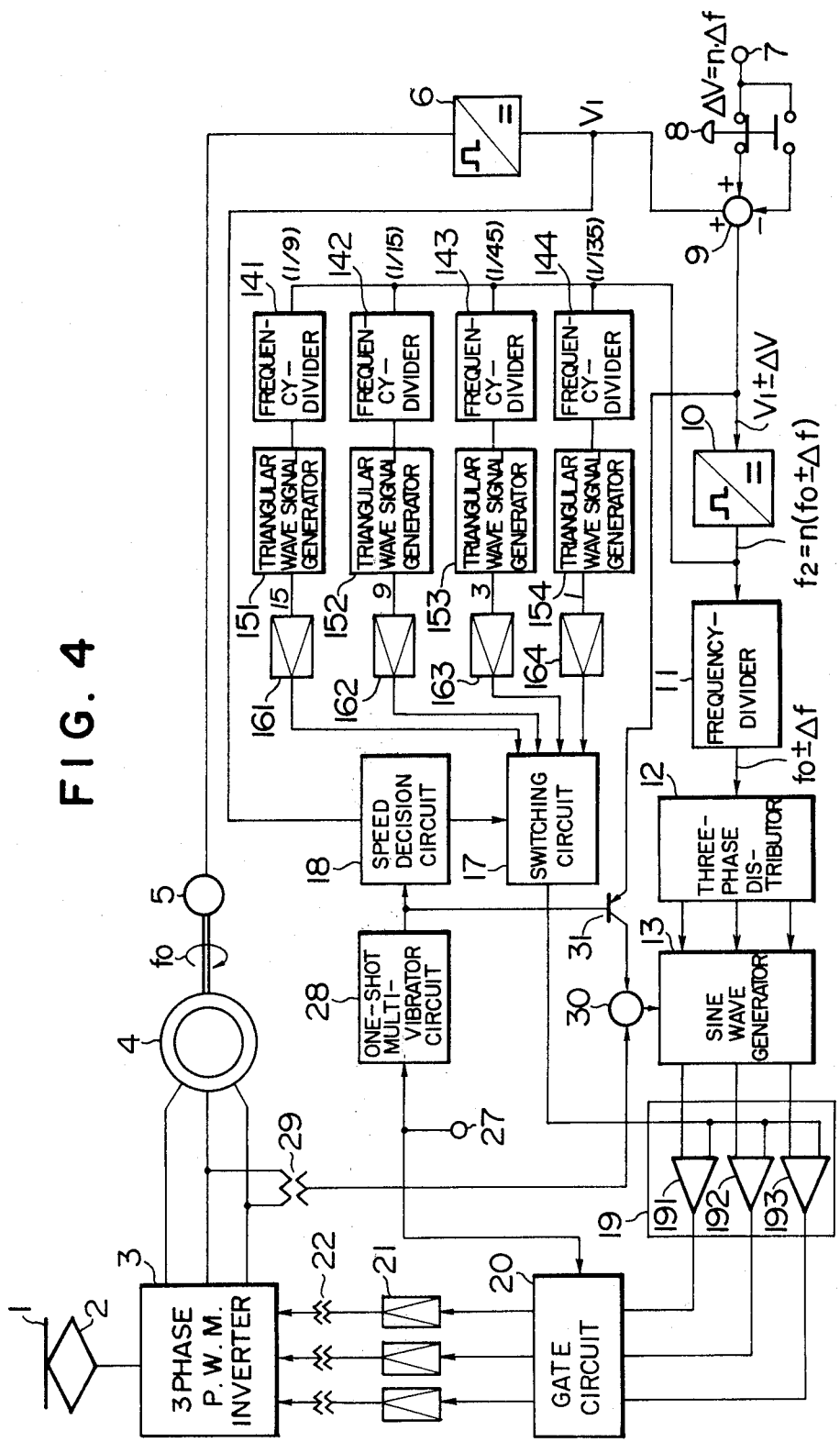
FIG. 4 is a block diagram showing another embodiment of the induction motor control system according to the present invention.

Another embodiment of the present invention is shown in FIG. 4 in which reference numerals similar to those in FIG. 1 designate similar component elements in FIG. 1. This embodiment is different from that of FIG. 1 in that in this embodiment the current control system in FIG. 1 is replaced by a voltage regulation system for maintaining the voltage-to-frequency ratio constant. The output voltage $V_1 \pm \Delta V$ of the adder-subtractor is an analog signal proportional to the frequency command $f_0 \pm \Delta f$ of the inverter. If a voltage proportional to the voltage $V_1 \pm \Delta V$ is generated in the inverter 3, the inverter may be controlled in such a manner that the voltage-frequency ratio is constant. The output voltage of the adder-subtractor 9 is compared with the output of the output voltage detector 29 of the inverter 3 at the comparator 30, and the peak value of the sine wave output of the sine wave generator 13 is adjusted in accordance with the error therebetween, thereby making up the operation of the voltage regulation system.

For lack of the constant-current system, the surge current is not avoided at the time of inverter operation start. In order to overcome this problem, it is necessary to limit an amplitude of the output voltage of the voltage regulation system for a predetermined period of time. In the drawing, a transistor 31 is inserted in a manner to limit the voltage command $V_1 \pm \Delta V$ of the voltage regulation system so that the conductivity of the transistor is reduced for a period of time during which the one-shot multivibrator circuit 28 produces an output. It is also easy to limit the output voltage of the inverter in the sine wave generator 13 or the modulator circuit 19.

We claim:

1. In an induction motor control system comprising an induction motor, an inverter for supplying power to said induction motor, and a control device of pulse width modulation type for controlling said inverter, said control device including frequency command generator means for said inverter, means for generating a sine wave of a frequency corresponding to said frequency command, means for generating a triangular wave of a frequency N times the frequency of said sine wave (N: 1 or larger integer), means for deciding one of a plurality of speed ranges in accordance with the speed of said motor, means for selecting by a switching operation a frequency of said triangular wave so as to reduce the value N depending on the increase in the speed range decided by said speed decision means, means for comparing said triangular wave with said sine wave, and means for controlling said inverter in accordance with the output pulse train of said comparator means; the improvement further comprising means for inhibiting said value N from becoming 1 at least for a predetermined period of time during transition of said inverter from an idle state to an active state.

2. An induction motor control system according to claim 1, further comprising means for generating a current command for said motor, means for detecting the current of said motor, means for comparing said current command with a detected current value, and a current control system for regulating the output voltage of said inverter in accordance with the output of said comparator means.

3. An induction motor control system according to claim 2, wherein said current control system includes means for adjusting the peak value of said sine wave in accordance with the output of said comparator means.

4. An induction motor control system according to claim 1, wherein said frequency command generator means includes means for detecting the speed of said motor, means for setting a slip frequency of said motor, and adder-subtractor means for executing addition and subtraction operations between said slip frequency and said detected speed.

5. An induction motor control system according to claim 1, further comprising means for generating a voltage command proportional to said frequency command, means for detecting the output voltage of said inverter, means for comparing said voltage command with the detected voltage, a voltage regulation system for regulating the output voltage of said inverter in accordance with the output of said comparator means, and means for suppressing the output voltage of said inverter for said predetermined period of time.

6. An induction motor control system according to claim 1, wherein said triangular wave generator means includes means for generating a plurality of triangular waves of different frequencies which are integral multiples of the frequency of said sine wave, and said switching means includes a switching circuit for selecting one of the triangular waves in response to the output of said speed decision means.

7. An induction motor control system according to claim 6, wherein said triangular wave generator means includes a plurality of frequency divider means for receiving a pulse train of a frequency proportional to a result of a selected one of addition and subtraction between the speed of said motor and the slip frequency and for dividing the frequency of the pulse train by different frequency ratios, and a plurality of triangular wave generator means for generating triangular waves of frequencies corresponding to the output pulse trains produced from said frequency divider means respectively.

8. An induction motor control system according to claim 1, wherein said sine wave generator means includes three-phase distributor means for receiving a pulse train of a frequency proportional to a result of a selected one of addition and subtraction between the speed of said motor and the slip frequency and for distributing three-phase pulse trains having pulses repeating at equal intervals, and three-phase sine wave generator means for generating three-phase sine waves of frequencies corresponding to said three-phase pulse trains respectively.

9. A method of controlling an induction motor, comprising the steps of generating a frequency command for an inverter, generating a sine wave of a frequency corresponding to said frequency command, generating a triangular wave of a frequency N times (N: 1 or a larger integer) the frequency of said sine wave, deciding one of a plurality of speed ranges in accordance with the speed of said motor, selecting by a switching operation a frequency of said triangular wave so as to reduce the value N depending on the increase in the speed range decided by said decision means, comparing said triangular wave with said sine wave, controlling said inverter in accordance with the output pulse train of said comparator means, and inhibiting the value N from becoming 1 at least for a period of time during the transition of said inverter from an idling state to an active state.

10. A method according to claim 9, further comprising the steps of generating a current command for said motor, detecting the current of said motor, comparing said current command with a detected current value, and regulating the output voltage of said inverter in accordance with the comparison result.

11. A method according to claim 10, wherein said voltage regulation step includes a step of adjusting the peak value of said sine wave in accordance with the comparison result.

12. A method according to claim 9, wherein said frequency command generation step includes steps of detecting the speed of said motor, setting the slip frequency of said motor, and executing a selected one of addition and subtraction operations between said detected speed and said slip frequency.

13. A method according to claim 9, further comprising steps of generating a voltage command proportional to said frequency command, detecting the output voltage of said inverter, comparing said voltage command with a detected voltage, regulating the output voltage of said inverter in accordance with the comparison result, and suppressing the output voltage of said inverter for said predetermined period of time.

14. A method according to claim 9, wherein said triangular wave generation step includes a step of generating a plurality of triangular waves of different frequencies each being an integral multiple of the frequency of each of said sine waves, and said frequency switching step includes a step of selecting one of the triangular waves in accordance with said decision.

15. A method according to claim 14, wherein said triangular wave generation step includes steps of frequency dividing an input pulse train at different dividing ratios, said input pulse train having a frequency proportional to a result of selected one of addition and subtraction operations between the speed of said motor and the slip frequency, and generating a plurality of triangular waves of frequencies corresponding to the output pulse trains produced in said frequency dividing step.

16. A method according to claim 9, wherein said sine wave generation step includes steps of receiving an input pulse train of a frequency proportional to a result of a selected one of addition and subtraction operations between the speed of said motor and the slip frequency and separating said input pulse train into three-phase pulse trains each having pulses repeated at equal intervals, and generating three-phase sine waves of frequencies corresponding to said three-phase pulse trains respectively.

* * * * *